Oct. 17, 1933.    W. H. FARR    1,930,676
ADJUSTABLE TIE ROD CONNECTION
Filed Aug. 1, 1931
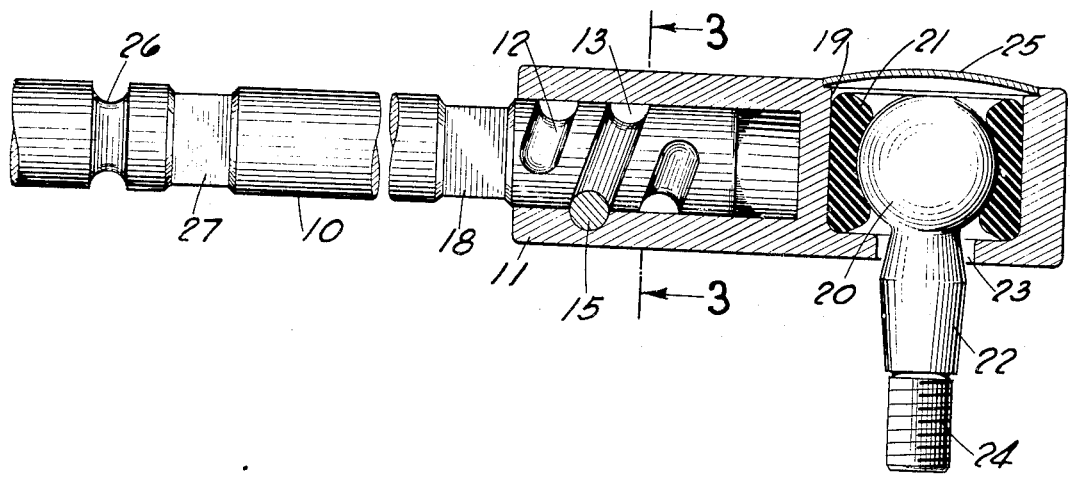
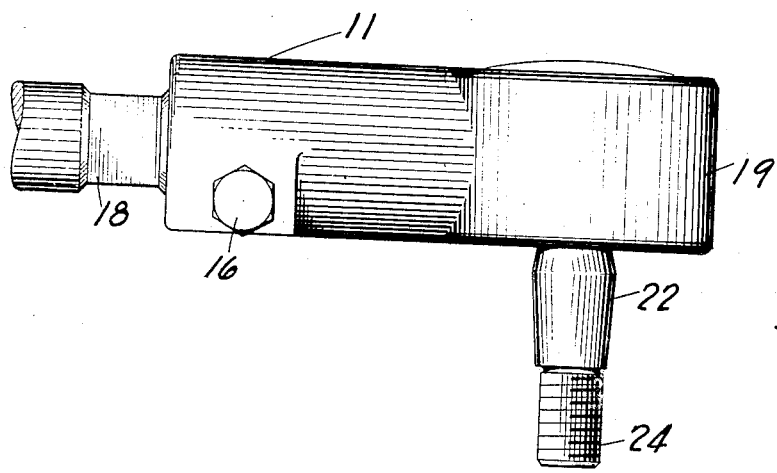
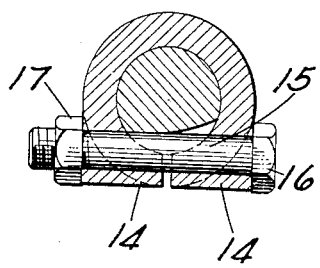
INVENTOR.
WARREN H. FARR
BY John P. Tarbox
ATTORNEY.

Patented Oct. 17, 1933

1,930,676

UNITED STATES PATENT OFFICE 1,930,676

ADJUSTABLE TIE ROD CONNECTION

Warren H. Farr, Detroit, Mich., assignor to Budd Wheel Company, Philadelphia, Pa., a corporation of Pennsylvania Application August 1, 1931. Serial No. 554,484

3 Claims. (Cl. 287—58)

My invention relates to the art of tie rod connections and particularly to tie rod connections of peculiar applicability to a tie rod end connected with associated members through a rubber torque transmitting connection such as that illustrated in the patent application of Ralph H. Rosenberg, Serial No. 506,393, filed January 3, 1931. I have sought to produce a connection between a tie rod end and a rubber joint of the general type illustrated in that application which will be simple and economical to produce and which will afford adequate provision for a quick and satisfactory adjustment.

The manner in which I have achieved these and other objects of my invention will be obvious from a reading of the sub-joined specification in the light of the attached drawing, in which, Fig. 1 is a central longitudinal section through the socket member of my improved joint, the parts being shown in elevation for the sake of clarity.

Fig. 2 is a detail side elevation of my improved joint, and

Fig. 3 is a section on the line 3—3 of Fig. 2.

Referring to the drawing by reference characters, the numeral 10 indicates a tie rod adapted to connect the steering mechanism for operating the two steering wheels of an automotive vehicle. This tie rod is coupled to the associated connections through which the wheels are steered by means of a housing 11 which is formed with a hollow socket 13 adapted to receive an end of the tie rod. The tie rod end which is so received is provided in its periphery with a spiral groove 12 and a pin 15 which is fixed against rotation relatively to the housing 11 has a portion extending within the socket 13 which is adapted to be received within this spiral groove. The housing 11 is transversely split for a limited distance from its inner axial extremity as indicated at 14, and the pin 15 is in the nature of a bolt having a head 16, this bolt being adapted to interconnect these split ends. The nut 17 coacts with the threaded portion of the bolt opposite the head 16 to secure the parts in their adjusted relationship. The main body of the tie rod is provided with a flattened portion 18 adjacent the portion thereof which telescopes within the socket 13 to facilitate the manipulation of the tie rod by a wrench or other suitable tool.

From the above description it will be obvious that the socket and tie rod may be relatively adjusted by simply relieving the tension upon the split ends 14—14 of the socket member by unscrewing the nut 17 and applying a suitable tool to the flattened portions 18 of the tie rod to effect a relative rotation of these parts, and thus adjust the length of the connected portions through a relative movement of the pin 15 within the spiral groove 12. After the adjustment is completed the nut 17 is tightened to clamp the parts in their adjusted relationship.

The housing 11 is provided beyond the socket 13 with a recessed portion 19 adapted to constitute the female member of a universal joint. This recess is adapted to receive a male member 20 in the form of a spherical head and a rubber sleeve 21 is received between the male and female members of the joint in a condition of substantial mass tension due to the distortion imposed upon this member during the assembly of the parts of the joint. The male member of the joint is provided with a shank 22 which passes through an opening 23 in the under side of the housing. This male member is threaded at 24 and is adapted to be interconnected with a suitable operating lever associated with the steering mechanism. A cap 25 is received within the recessed portion at the top of the female member of the joint.

The end of the tie rod opposite the adjustable connection above described is provided with a circular groove 26 which is adapted to be received within a socket in the housing which is interconnected with the opposite steering wheel of the vehicle. This socket is provided with a suitable pin or ball bearing adapted to be received partially within the socket and partially within the groove 26 to afford a rotatable connection and an axially fixed connection between these parts. It will thus be seen that the tie rod may be easily rotated relatively to the housing members secured to the opposite ends thereof to effect the desired adjustment between the tie rod and its associated parts.

It will be seen that my invention affords provision for a readily adjustable rubber tie rod connection of very simple design in which a single housing serves both as a socket to adjustably receive an end of the tie rod and as a female member of the rubber joint through which the tie rod is interconnected with other parts of the vehicle.

Modifications will be obvious to those skilled in the art and I do not therefore wish to be limited except by the generic spirit of my invention as interpreted in the light of the attached claims.

No claims are made herein to the particular construction of rubber joint above described and illustrated in Fig. 1, as this joint is fully disclosed in the copending prior application of Ralph H. Rosenberg, above identified.

What I claim is:

1. A tie rod connection including in combination a tie rod end formed with a spiral groove, a socket member split longitudinally and provided with a bolt therethrough adapted for tightening said socket member around said tie rod end, the shank of said bolt adapted for engagement with said spiral groove within said socket member.

2. A tie rod connection including in combination a tie rod end formed with a spiral groove, a longitudinally split socket member provided with adjustable means serving to clamp said socket member around said tie rod end, said means engaging said groove in said tie rod end within said socket member.

3. A tie rod connection including in combination a tie rod end formed with a spiral groove therearound, a socket member split longitudinally and provided with a bolt passing therethrough adapted for tightening said socket member around said tie rod end, said bolt having a shank portion lying partially within said groove in said tie rod end passing tangentially to the periphery thereof.

WARREN H. FARR.